April 27, 1926.   R. L. GALLOP   1,582,593
RADIUS ROD BRACE
Filed June 23, 1925
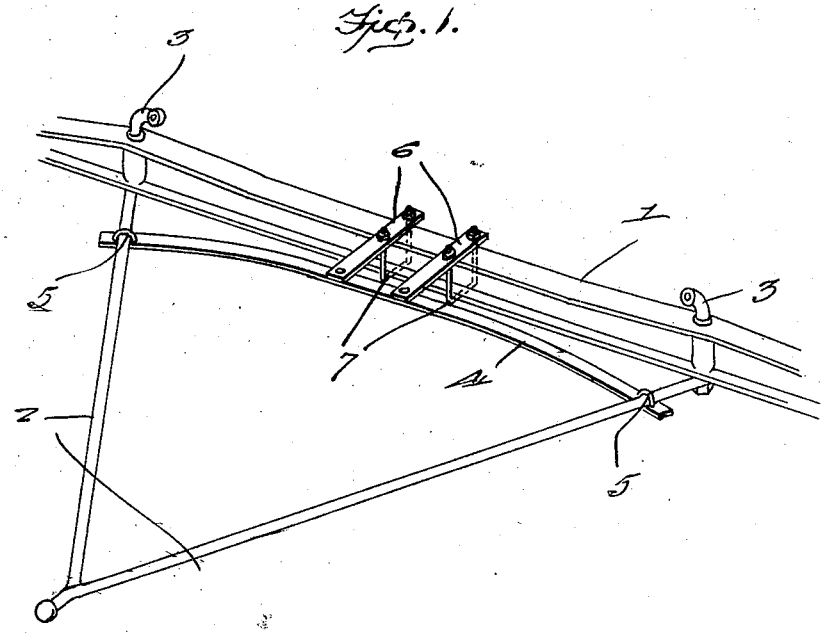
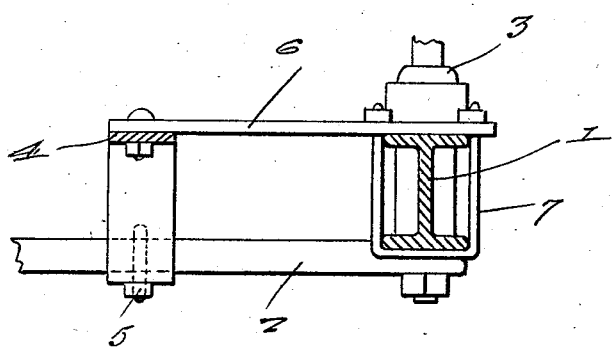
Inventor
R. L. Gallop
By Clarence A. O'Brien
Attorney Patented Apr. 27, 1926.

1,582,593

UNITED STATES PATENT OFFICE.

RUSSELL L. GALLOP, OF HARBINGER, NORTH CAROLINA.

RADIUS-ROD BRACE.

Application filed June 23, 1925. Serial No. 39,088.

*To all whom it may concern:*

Be it known that I, RUSSELL L. GALLOP, a citizen of the United States, residing at Harbinger, in the county of Currituck and State of North Carolina, have invented certain new and useful Improvements in a Radius-Rod Brace, of which the following is a specification.

This invention relates to an improved brace for automobile radius rods of the type extending in rearwardly converging relation and connected at their outer ends to the front axle and at their opposite ends to the engine crank case.

The primary object is to generally improve upon devices of this class by providing one of comparative simplicity and durability which may be easily attached to the existing parts without requiring alterations and without interfering with the function of the said parts, the construction being such that the device is rendered quite inexpensive and such that it may be applied by unskilled hands.

Another feature is to provide a device of this kind which serves as an anti-rattler, thus doing away with the undesirable chattering and metallic noises accompanying the presence of the usual radius rod construction.

Moreover it is an equally important feature to provide a brace which is in the form of a resilient bar, the same being anchored at its center to the central portion of the front axle and having its opposite end connected to the forward ends of the diverging radius rods in the manner to exert an upward spring thrust against these ends to hold them in place in the event that they become accidentally disconnected from the spring perch bolt.

Other features and advantages of the invention will become apparent from the following description and drawings.

In the accompanying drawings forming a part of this application and in which like numerals are employed to designate like parts throughout the same:

Figure 1 is a perspective view of a portion of an automobile axle showing the radius rods and the improved brace in association therewith.

Fig. 2 is an enlarged detail section showing the construction more plainly.

In the drawings the reference character 1 designates the front axle of an automobile, for instance of the Ford type. The reference character 2 designates the customary radius rods which are connected at their forward ends to the transverse leaf spring perches 3. These parts are conventional and form no part of the invention.

The invention comprises a longitudinally bowed resilient bar or strip 4, connected by appropriate clamps 5 at its outer ends to the forward ends of the radius rods 2. Strips 6 are fastened to the central portion of the brace rod at longitudinally spaced points and U-shaped clips 7 are connected to the outer ends of these strips 6 and surround the intermediate portion of the axle. In this connection it is to be stated that these clamps comprising the parts 6 and 7 are disposed on opposite sides of the usual central clip for the leaf spring. By having the strips 6 at the top or just above the plane of the top of the axle, the central portion of the brace bar is raised up and the outer ends thereof are disposed beneath the radius rods. The radius rods being in a plan to the bottom of the axle, it is obvious that the resiliency of the brace bar exerts some fifteen or twenty pounds upward pressure on these bars. In this way, in the event that the forward ends of the radius rods, accidentally disconnect from the spring perches, they are nevertheless maintained in place by the brace. The brace in addition prevents movement toward or from each other of the bars and otherwise increases the rigidity of structure and prevents undue rattling.

A careful consideration of the description in connection with the drawings will, no doubt, enable persons familiar with structures of this kind to obtain a clear understanding of the same. Therefore a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. In combination, an axle, radius rods connected at their forward ends to the axle at longitudinally spaced points, and resilient means anchored at its center to the central portion of the axle and connected at its ends to the forward portions of the radius rods for exerting an upward thrust upon the latter.

2. In combination, an axle, a pair of radius rods connected at their forward diverging ends to the axle at longitudinally spaced points, a clamp connected with the intermediate portion of said axle, and a resilient brace bar connected at its center with said clamp and having its outer ends connected with the forward end portions of said rods, the outer ends of said brace bar being disposed on a plane below the anchored central portion whereby to exert a resilient upward thrust upon the forward ends of the radius rods.

In testimony whereof I affix my signature.

RUSSELL L. GALLOP.